UNITED STATES PATENT OFFICE.

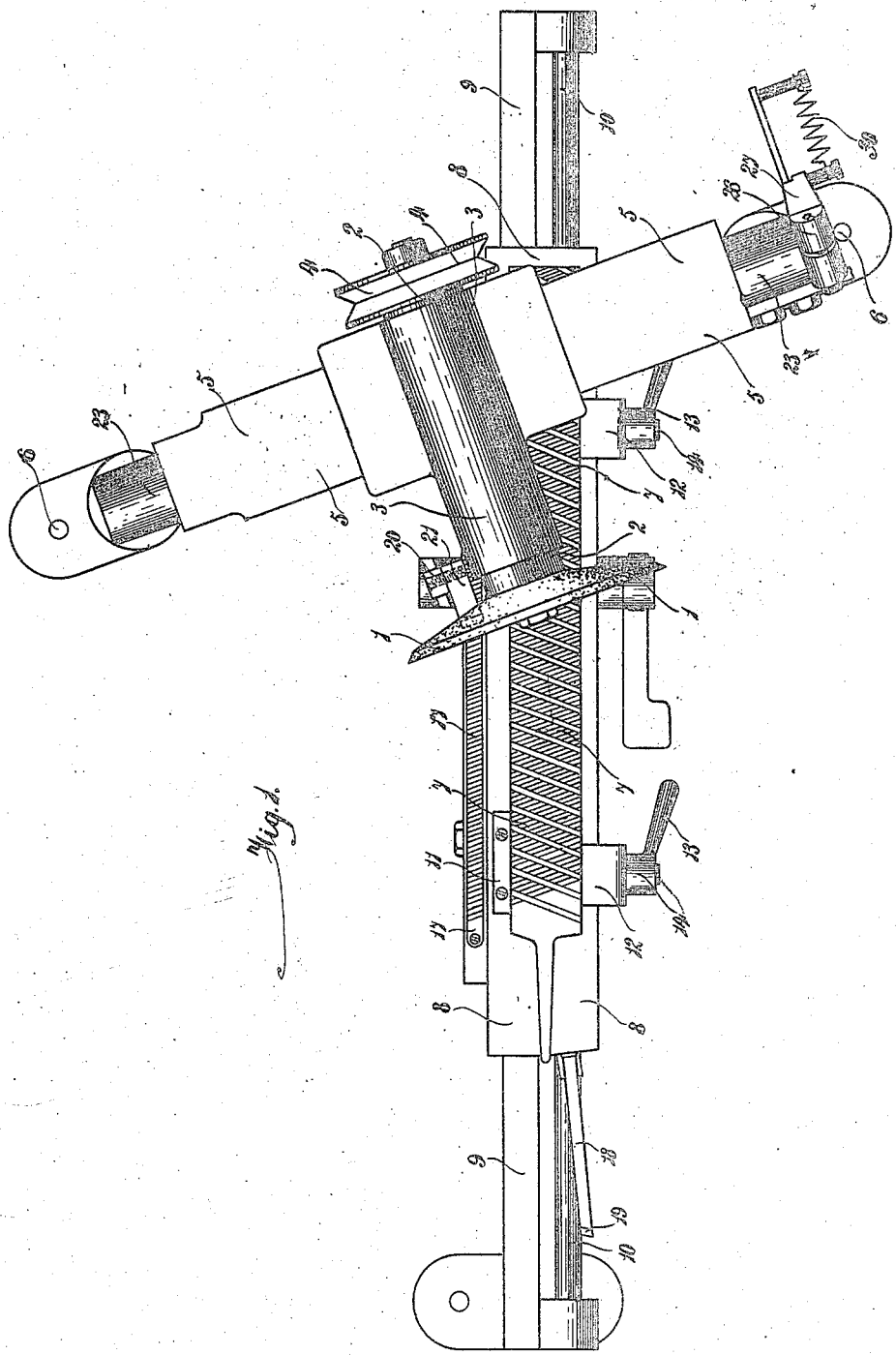

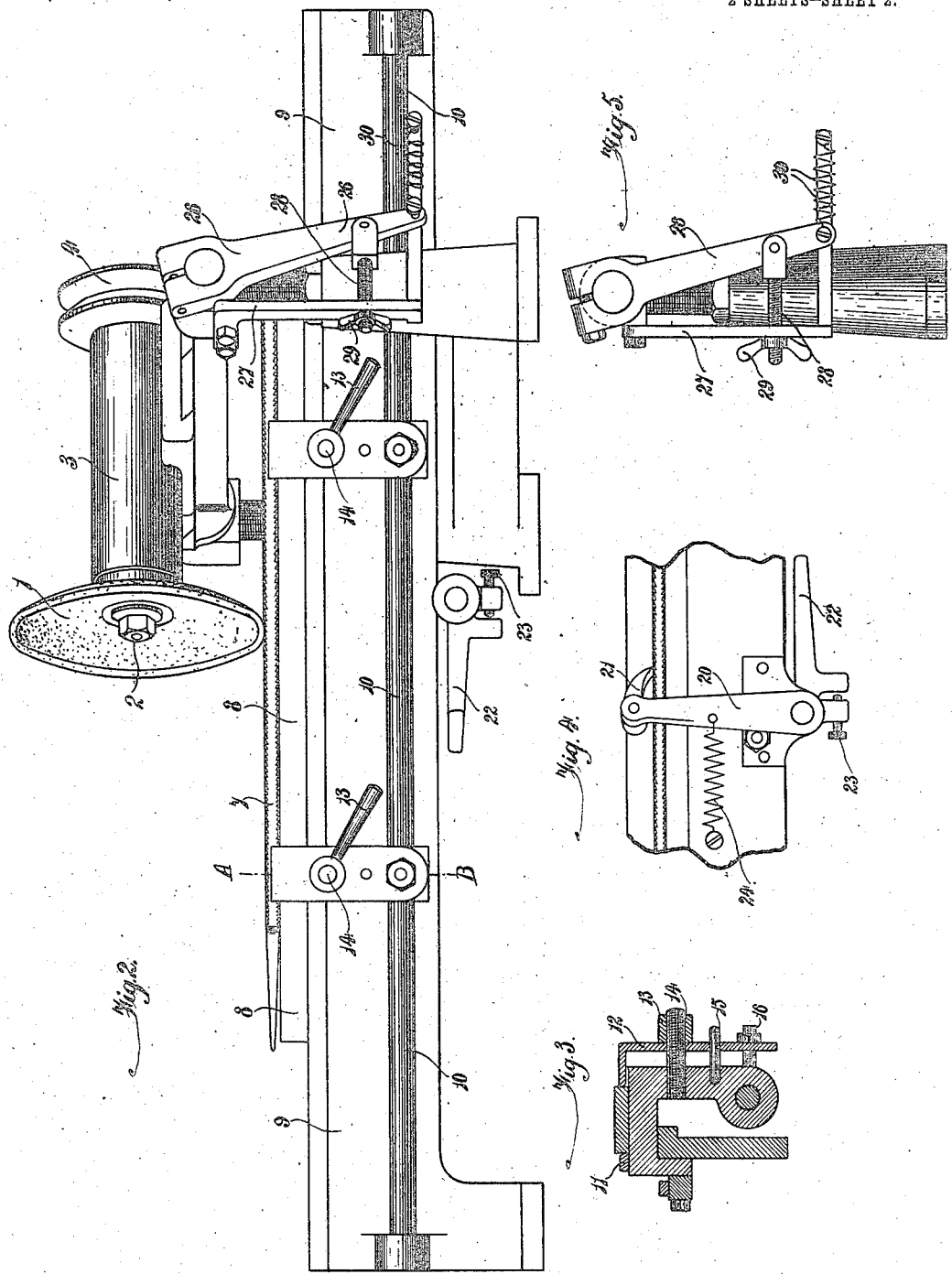

WILLIAM HENRY DENLEY, OF BIRMINGHAM, AND BENJAMIN MAKIN, OF SHEFFIELD, ENGLAND.

MACHINE FOR GRINDING FILES.

1,131,999.

Specification of Letters Patent.

Patented Mar. 16, 1915.

Application filed September 26, 1913. Serial No. 791,981.

*To all whom it may concern:*

Be it known that we, WILLIAM HENRY DENLEY and BENJAMIN MAKIN, subjects of the King of Great Britain, residing at 378 Moseley road, Birmingham, England, and Attercliffe Steel Works, Sheffield, England, respectively, have invented a new and useful Machine for Grinding Files; and we do hereby declare the following to be a full, clear, and exact description of the same.

Our invention relates to apparatus for grinding the teeth of files and refers to that class of such machines in which the file is carried by a slide or carrier and in which the grinding wheel is adapted to be traversed across the file, and has for its object to provide means for resharpening or grinding files of the type which are provided with parallel "milling" teeth after they have been cut or used; the invention being particularly applicable to the file described in the prior British specification No. 12592 A. D. 1910 of William Henry Denley.

Apparatus made in accordance with our invention comprises a bed plate, a table adapted to be fixed thereto in angular positions corresponding with the angle of the teeth to be ground and along which is moved a sliding head in which is mounted a spindle carrying the grinding wheel, means for driving the said spindle, a slide or carrier upon which the file may be clamped, and means for successively advancing the carrier relatively to the grinding wheel after each tooth has been ground.

Referring to the drawings:—Figure 1 is a plan of a machine constructed in accordance with the present invention. Fig. 2 is a front elevation of same. Fig. 3 is a section at A—B in Fig. 2. Fig. 4 illustrates the means for automatically advancing the file after each tooth has been ground. Fig. 5 illustrates the means for compensating for any inequalities which there may be in the surface of the file.

In carrying our invention into practice as illustrated upon the accompanying drawings, the grinding wheel 1 is carried by a spindle 2 supported in a head 3, said spindle having a pulley 4 whereby it is driven. The head 3 is slidably supported upon the table 5 which is adapted to be fixed to a bed plate in angular positions corresponding with the angle of the teeth to be ground, by suitable bolts passing through the holes 6. When this table is so fixed the head 3 may be moved along it, and obviously it will grind the edge of the teeth if the table be set at an exact angle corresponding with that of the file teeth. This sliding movement of the head may be effected directly by hand, or through the medium of a lever, or in any other suitable manner.

The file 7 is clamped upon a slide 8 which moves endwise upon the frame 9, the frame being provided with a suitable guide member 10. The clamping means includes an abutment 11 and a movable jaw 12 which is operated by a handle 13 engaging a screw 14 in combination with a peg 15 and adjustment screws 16 which enable the clamping device to be used for files of different widths. Adjacent to and forming part of this slide 8 is a "master rack" 17 having teeth cut upon it corresponding in form and pitch with the teeth of the file which is being ground, and carried by the slide is a pivoted arm 18 having a hooked end 19 which is adapted to be brought into engagement with the first tooth on the file when setting the file in the machine, thereby insuring that the position of the file shall exactly register the "master rack."

Means are provided for advancing the file one tooth after each tooth has been ground, such means including a pivoted arm 20 carrying a pawl 21 engaging with the rack, and a hand lever 22 or treadle lever, so arranged that when the lever 22 is depressed the rack and consequently the slide and file are advanced one tooth bringing the next tooth into position for grinding. An adjustment screw 23 is provided so that each full depression of the lever 22 can be arranged to advance the file the required distance, and which distance may be varied when desired for use with files of different pitch, the parts being returned to their initial position by the spring 24.

The "master rack" is detachable and one of such racks will be cut for each pitch of file which is to be ground, being provided with corresponding teeth.

The machine is particularly intended for regrinding teeth on files which have become blunt by use. It is found that in practice files sometimes become slightly bent in use, and the present machine therefore includes a compensating arrangement for permitting the front vertical edge of the tooth to be ground for its full depth with files of different thicknesses or on files which have become bent and the teeth consequently of different heights. The table 5 is therefore capable of a slight oscillatory movement about the spindle 25, the front end of which is provided with an arm 26 connected to a fixed member 27 by a screw 28 and wing nut 29, said arm being normally held back by the influence of the spring 30. In practice the head and slide are given a slight pivotal movement within the limits allowed by the screw and nut 28, 29, and spring 30.

The grinding disk is shown of a form adapted to grind the front vertical surface of the file tooth described in the prior patent, but if desired a disk with a square edge might be employed for grinding the tops of the file teeth.

What we claim then is:—

1. In a machine for grinding files, the combination of a bed; a file carrier slidably supported upon the bed; a table mounted upon the bed; a slide movable along said table; a grinding wheel rotatably supported upon said slide; means for traversing said grinding wheel across said carrier; means for adjusting the angle of said table to correspond with the angle of the teeth across the file to be ground; means for progressively advancing the file relatively to the grinding wheel; and means for regulating the amount of such advance movement to correspond with the pitch of the file and teeth.

2. In a machine for grinding files, the combination of a bed; a file carrier slidably supported upon the bed; a table mounted upon the bed and adapted to be adjusted angularly relatively thereto to correspond with the angle of the teeth of the file to be ground; a slide movable along said table; a grinding wheel rotatably supported upon said slide; a "master rack" having inclined teeth corresponding with the teeth upon the files to be ground; means for initially positioning the file relatively to the "master rack"; a transversely disposed shaft carried by said bed; an arm on said shaft; a pawl on said arm engaging said "master rack"; a spring for retracting the arm and pawl; a lever carried by the said transversely disposed shaft and adapted when actuated to advance the file relatively to the grinding wheel; means for regulating the amount of such advance movement to correspond with the pitch of the file; and means for progressively advancing the file relatively to the grinding wheel for a distance corresponding with the pitch of the file and "master rack".

3. In a machine for grinding files, the combination of a bed; guides carried by said bed; a carrier slidably supported upon said bed and guides; screw controlled means for clamping the file in position upon the carrier; a table mounted upon the bed and adapted to be adjusted angularly relatively thereto to correspond with the angle of the teeth of the file to be ground; a slide movable along said table; a rotatable spindle carried by said slide; a driving pulley in said spindle; a grinding disk also carried by said spindle and rotatable therewith; means for enabling the grinding wheel to be raised and lowered relatively to the file; a "master rack" having inclined teeth corresponding with the teeth upon the files to be ground; means for initially positioning the file relatively to the "master rack"; a transversely disposed shaft carried by said bed; an arm on said shaft; a pawl on said arm engaging said "master rack"; a spring for retracting the arm and pawl; a lever carried by the said transversely disposed shaft and adapted when actuated to advance the file relatively to the grinding wheel; and means for regulating the amount of such advance movement to correspond with the pitch of the file.

4. In a machine for grinding files, the combination of a bed; a file carrier slidably supported upon the bed; a table mounted upon the bed and adapted to be adjusted angularly relatively thereto to correspond with the angle of the teeth of the file to be ground; a slide movable along said table; a grinding wheel rotatably supported upon said slide; a "master rack" having inclined teeth corresponding with the teeth upon the files to be ground; means for initially positioning the file relatively to the "master rack"; means engaging said master rack; means adapted when actuated to advance the file relatively to the grinding wheel through the means engaging the master rack; means for regulating the amount of such advance movement to correspond with the pitch of the file; and means for progressively advancing the file relatively to the grinding wheel for a distance corresponding with the pitch of the file and "master rack".

5. In a machine for grinding files, the combination of a bed; guides carried by said bed; a carrier slidably supported upon said bed and guides; screw controlled means for clamping the file in position upon the carrier; a table mounted upon the bed and adapted to be adjusted angularly relatively thereto to correspond with the angle of the teeth of the file to be ground; a slide movable along said table; a rotatable spindle carried by said slide; a driving pulley in said spindle; a grinding disk also carried by said spindle and rotatable therewith and means for enabling the grinding wheel to be raised and lowered relatively to the file.

6. In a machine for grinding files, the combination of means for holding said file;

a grinding wheel; means for rotating said grinding wheel; means for traversing said grinding wheel across the file; means for adjusting the angle at which said traversing takes place; and compensating means for permitting the front vertical edge of the file tooth to be ground to its full depth with files of different thicknesses or which have become bent.

In testimony whereof, we have signed our names to this specification in the presence of two subscribing witnesses.

WILLIAM HENRY DENLEY.
BENJAMIN MAKIN.

Witnesses:
HAROLD F. FORRESTER,
EVAN L. W. BYRNE.